United States Patent Office 2,963,508
Patented Dec. 6, 1960

2,963,508

PROCESS FOR OXIDATION OF MONOALKYL NAPHTHALENE

Robert S. Barker, Port Washington, and Alfred Saffer, Bayside, N.Y., assignors to Mid-Century Corporation, Chicago, Ill., a corporation of Delaware No Drawing. Filed Mar. 10, 1958, Ser. No. 720,002

5 Claims. (Cl. 260—524)

This invention relates to a process for the catalytic oxidation of organic compounds. More particularly, it pertains to the oxidation of naphthalene compounds containing an aliphatic substituent to produce corresponding naphthalene mono-carboxylic acids using molecular oxygen as the oxidizing means, and especially to a liquid phase oxidation process catalyzed by the conjoint presence of a metal oxidation catalyst and bromine.

In our copending application Serial No. 530,401, now U.S. Patent No. 2,833,816, there is disclosed a novel process for the catalytic oxidation by means of molecular oxygen of aromatic organic compounds containing at least one and preferably a plurality of aliphatic substituents to produce carboxy aromatic compounds. In accordance with the process disclosed in said application, of which the present application is a continuation-in-part, aromatic compounds containing aliphatic substituents are treated with molecular oxygen in the liquid phase in the presence of a metal oxidation catalyst and bromine to effectively and selectively oxidize the aliphatic substituents to carboxylic acid groups.

We have found that liquid phase oxidation with molecular oxygen in the presence of catalytic amounts of bromine and of heavy metal oxidation catalysts is particularly effective for the conversion of substituted naphthalene compounds having an oxidizable aliphatic substituent to the corresponding naphthalene mono-carboxylic acids.

One object of our invention, therefore, is to provide a process for the oxidation of nuclear substituted naphthalene compounds to naphthalene mono-carboxylic acids. A further object is to provide a process for the preparation in high yields and high conversions of naphthalene mono-carboxylic acids. A still further object is to provide a process for the oxidation of mono-alkyl naphthalenes to the corresponding aromatic carboxylic acids. A still further object is to provide a novel catalyst system for the oxidation in the liquid phase with molecular oxygen of naphthalene compounds having oxidizable substituents to naphthalene mono-carboxylic acids. These and other objects of our invention will be apparent from the ensuing description thereof.

In the practice of the invention, the oxidation of organic compounds whereby naphthalene mono-carboxylic acids are obtained may be effected by reacting such compounds with molecular oxygen, e.g. air, in the conjoint presence of bromine and a heavy metal oxidation catalyst. As the heavy metal oxidation catalyst there may be employed catalysts that have heretofore been employed for accelerating the oxidation of organic compounds, such as the solid polyvalent metals having atomic weights between about 50 and 200. Of the heavy metal group, those metals having an atomic number not greater than 84 have been found most suitable. Excellent results are obtained by utilization of a metal having an atomic number 23–28, including vanadium, chromium, manganese, iron, cobalt and nickel. Particularly excellent results are obtained with a metal of the group consisting of manganese, cobalt and mixtures thereof.

It has been found that the catalytic amount of the metal may be either as a single metal or as a combination of such metals. The metal may be added in elemental, combined or ionic form and the bromine may similarly be added in elemental, combined or ionic form. As a source of bromine, ammonium bromide or other bromine compounds soluble in the reaction medium may be employed. Satisfactory results have been obtained for example, with potassium bromide, tetrabromoethane and benzyl bromide.

The metal may be supplied in the form of the free metal, as the oxide or hydroxide, or in the form of metal salts. For example, the metal manganese may be supplied as the manganese salt of a lower aliphatic carboxylic acid, such as manganese acetate, as the salt of a fatty acid, such as manganese oleate or linoleate, as the metal salt of an aromatic or alicyclic acid, such as manganese naphthenate, or in the form of an organic complex, of which mention may be made of the acetylacetonate, the 8-hydroxy-quinolinate and the ethylene diamine tetra-acetate, etc., as well as manganese salts such as the borates, halides, nitrates and the like which are also efficacious.

The reaction temperature should be sufficiently high so that the desired oxidation reaction occurs, and yet not so high as to cause undesirable charring or formation of tars. Thus temperatures in the range of about 120° to about 275° C., desirably 150° to 250° C. and preferably 170° to 225° C. may be employed. The reaction time should be sufficient to obtain a desirable conversion of the substituted aromatic material to the desired mono-carboxylic acid, e.g. in the range of about 0.5 to about 25 or more hours, upreferably up to about 4 hours.

The oxygen used may be in the form of substantially 100% oxygen gas or in the form of gaseous mixtures containing lower concentrations of oxygen, such as, for example, air. The ratio of total oxygen fed into the reaction mixture relative to the aromatic compound oxidized is in the range of about 2 to 500 moles of oxygen per mole of substituted aromatic material, desirably in the range of 5 to 300 and preferably in the range of 5 to 75.

The process of the present invention is conducted under essentially liquid phase conditions, desirably in the presence of an oxidation resistant reaction medium in which the organic reactant is soluble or suspended. The relation of temperature and pressure is so regulated as to provide a liquid phase in the reaction zone. Generally the pressure may be in the range of atmospheric to about 1500 p.s.i.g., the pressure being sufficient at the operating temperature to maintain all or a part of the organic reactant in the liquid phase.

As inert reaction media there may be employed materials substantially inert to oxidation which facilitate carrying out the desired reaction and recovering the desired product or products. Desirably this added medium is a mono-carboxylic acid relatively stable or inert to oxidation in the reaction system, preferably containing about 2 to 8 carbon atoms in the molecule, for example saturated aliphatic mono-carboxylic acids, aromatic acids such as benzoic acid, alicyclic acids such as cyclohexane carboxylic acid and the like. Saturated aliphatic mono-carboxylic acids containing 2 to 4 carbon atoms are particularly preferred. Mixtures of acids may be used, for example mixtures of said lower carboxylic acids, or mixtures of such acids with benzoic acid. Where all of the advantages of an acid medium are not required, other inert media may be used of which mention may be made of benzene, carbon tetrachloride, chlorinated hydrocarbons such as chlorinated benzenes or chlorinated naphthalenes, and the like.

Where the lower aliphatic monocarboxylic acid medium is used, it is generally not necessary to use large amounts thereof. Such acids in the range of 0.1 to 10 parts by weight, desirably 0.5 to 4 and preferably 1 to 2.5 per part of aromatic material have been found adequate.

The catalyst, illustratively, may be a heavy metal bromide, for example, manganese bromide, and may be added as such or by means of materials which provide a catalytic amount of heavy metal and of bromine in the reaction system. The heavy metal oxidation catalyst may be added in the form of the metal, oxide, acetate or analogous carboxylate salts or as a heavy metal halide; and the bromine may, as above indicated, be added in the form of elemental bromine, ammonium bromide, hydrogen bromide or other bromine compound soluble or partially soluble in the system, e.g. potassium bromate. If desired, the bromine may be in the form of a soluble organic bromide, viz. tetrabromoethane, benzyl bromide and the like. The amount of catalyst, for example of manganese and bromine, calculated as $MnBr_2$ may be in the range of about 0.1 to 10% by weight or more of the aromatic reactant charged, desirably 0.3 to 2 and preferably 0.5 to 1.7 percent. Mixtures of materials may be used, and the proportions of heavy metal oxidation catalyst and bromine may be varied from their stoichiometric proportions encountered in heavy metal bromides such as $MnBr_2$, for example in the range of about 1 to 10 atoms of heavy metal per atom of bromine to about 1 to 10 atoms of bromine per atom of heavy metal.

In order to facilitate a clear understanding of the invention, the following preferred specific embodiments are described in detail.

Example 1

In a tubular reactor fitted with a stirrer and heating means and provided with a water cooled condenser, gas inlet means and valved gas outlet for adjusting the exit flow of gas are charged 25 parts of alpha-methylnaphthalene, 150 parts of glacial acetic acid and a solution of 1.2 parts of a mixture of cobalt acetate and manganese acetate (as the tetrahydrates) and 0.4 part of ammonium bromide in 6 parts of water. The mixture is heated at 400° F. while air at 400 p.s.i.g. is passed through the mixture at a rate of 3.7 liters/minute, the reactor pressure being maintained throughout at 400 p.s.i.g. The oxygen content of the vent gases drops to a value of about 8.6%, then rises to 20.8%. The reactor is cooled, the contents removed and the solvent removed by evaporation on a steam bath. The residue is dissolved in dilute aqueous caustic solution, filtered, and the filtrate acidified with hydrochloric acid. The precipitated solids are collected on a filter, washed with water and dried to yield 22.5 parts of alpha-naphthoic acid of melting point 159°–161° C. and neutral equivalent of 171 (calculated value 172). The yield of alpha-naphthoic acid is 75 mole percent based on alpha-methylnaphthalene charged.

In the absence of ammonium bromide, otherwise employing the same charge and the same conditions as described above, 8.0 parts of unreacted alpha-methylnaphthalene were recovered and the yield of alpha-naphthoic acid was only 10 parts or 48% based on alpha-methylnaphthalene converted.

Example 2

The procedure of Example 1 was repeated substituting 25 parts of beta-methylnaphthalene for the alpha-methylnaphthalene previously employed. There were obtained 25 parts of beta-naphthoic acid having a melting point of 179–183° C. and a neutral equivalent of 171 (calculated value 172). The yield of beta-naphthoic acid was 83 mole percent based on beta-methylnaphthalene charged.

Example 3

To the reactor described in Example 1 were charged 20 parts of alpha-isoamylnaphthalene, 150 parts of glacial acetic acid and a solution of 2.5 parts of a mixture of cobalt acetate and manganese acetate (as the tetrahydrates) and 1.0 part of ammonium bromide in 6.0 parts of water. The reactor was heated to 400° F. and air at 400 p.s.i.g. passed through the mixture at a rate of 3.7 liters/minute, the reactor pressure being maintained throughout at 400 p.s.i.g. The oxygen content of the vent gases dropped to a value of 12.4%, then rose gradually to 20.8%. The reactor was then cooled, the contents removed and the solvent removed by evaporation on a steam bath. The residue was treated with dilute aqueous caustic solution and filtered to remove insoluble nonacidic material. The filtrate was acidified with hydrochloric acid, and the precipitated solids filtered off and washed with water. There were obtained 10 parts of alpha-naphthoic acid equal to a yield of 50 mole percent.

In the absence of ammonium bromide, otherwise employing the same charge and conditions as described above, 7.0 parts of unreacted alpha-isoamylnaphthalene were recovered from the oxidized mixture and the yield of alpha-naphthoic acid was only 6.5 parts or 37% based on alpha-isoamylnaphthalene charged.

Example 4

Following the procedure of Example 1, a mixture of 75 parts of 2-methylnaphthalene, 150 parts glacial acetic acid, 1.5 parts of a mixture of cobalt acetate and manganese acetate (as the tetrahydrates) and 1.0 part of ammonium bromide together with 1.0 part of benzyl peroxide was treated at a pressure of 400 p.s.i.g. and a temperature of 370° to 418° F. for about one hour with air at a rate of 400 liters per hour. The reactor contents were cooled, discharged and distilled to remove acetic acid and volatile materials. The residue was dissolved in an equal weight of benzene and extracted with about 2 volumes of 10% ammonium hydroxide. Acidification of the filtered ammonia solution, followed by filtration and recrystallization of the solid product from petroleum ether gave high purity 2-naphthoic acid having a melting point of 181–182° C. and an acid number of 315.

The process of the present invention can be conducted on a continuous, intermittent or batch basis. Water may be removed to maintain any desired concentration thereof, e.g., by distillation, by adding acetic anhydride or the like.

Desirable or comparable results may be achieved with various modifications of the process described and exemplified above. Thus, the pressure may be varied in the range of atmospheric up to about 1500 p.s.i.g., the pressure being sufficient to maintain all or a part of the organic reactant in the liquid phase. It will be recognized that time, temperature, catalyst concentration and the like are interrelated variables and may be varied depending upon the particular feedstock employed. Lower temperatures may, for example, be indicated where a more highly concentrated source of molecular oxygen is employed in lieu of air, for example, pure oxygen or mixtures of oxygen and inert gas containing 50% or more by volume of molecular oxygen.

The naphthalene compound fed into the reactor may be a monoalkylnaphthalene in technically pure form, free of contaminants or materials which may interfere with the oxidation reaction. It may be a mixture of isomeric materials, or such a mixture containing lower or higher homologs. Mixtures of materials may be used, converted to the corresponding mixtures of naphthalene monocarboxylic acids, which acids may then be separated, e.g. by physical means such as distillation or by a combination of chemical and physical means such as esterification followed by fractionation.

Aliphatic substituents on the naphthalene nucleus which are converted to carboxylic groups may comprise oxidizable alkyl groups of 1 to 8 carbon atoms, preferably 1 to 5 carbon atoms. Such substituents may include, for example, methyl, ethyl, isopropyl, butyl, hexyl and the like. Tertiary alkyl groups, for example the tertiary butyl group, which are attached to the aromatic nucleus at the site of the tertiary carbon atom, are more difficult to oxidize and may require more elevated temperature and/or higher catalyst concentration to effect conversion to the carboxyl group.

Partial oxidation products of the above mentioned materials may also be treated according to the present invention, e.g. where the alkyl substituent is converted to intermediate oxygenated derivatives such as alcohols, aldehydes, ketones, peroxide type compounds and the like.

Various non-interfering substituents may be present in the naphthalene nucleus in addition to the oxidizable aliphatic substituent. For example, one or more chloro, nitro, sulfonic acid and the like substituents which are unreactive in the oxidation system may be present, the substituted naphthalene compounds being converted to the corresponding chloro, nitro and the like naphthalene monocarboxylic acids.

The substituted naphthalene compounds which are employed as feedstocks in the present process may be of natural or synthetic origin. Monomethylnaphthalenes from coal-tar or petroleum sources, for example, petroleum fractions or fractions obtained from petroleum which has been subjected to various synthetic processes such as catalytic reforming, are suitable feedstocks for the present process.

The naphthoic acids produced by the process of the present invention are valuable for the preparation of a wide variety of chemical compounds. The esters thereof have been employed as plasticizers and softeners for thermoplastic resins and in preparations for protecting the skin for ultra-violet light. The free acids have been used in insecticides, weed control preparations and as plant growth promoting agents.

In view of the foregoing disclosures, variations and modifications of the invention will be apparent to those skilled in the art, and it is intended to include within the invention all such variations and modifications except as do not come within the scope of the appended claims.

We claim:
1. A process for producing naphthalene monocarboxylic acid which comprises reacting mono-alkylnaphthalene having from 1 to 8 carbon atoms in the alkyl group in the liquid phase at a temperature between about 120° C. and about 275° C. and a pressure between atmospheric and about 1500 p.s.i.g. with molecular oxygen in a solvent comprising a lower alkanoic monocarboxylic acid having from 2 to 8 carbon atoms in the molecule and in the conjoint presence of bromine and a heavy metal oxidation catalyst and recovering naphthalene monocarboxylic acid so formed.

2. A process as defined in claim 1 wherein the heavy metal has an atomic number of 23 to 28 inclusive.

3. A process as defined in claim 1 wherein the heavy metal comprises manganese and cobalt.

4. A process as defined in claim 1 wherein said mono-alkylnaphthalene is alpha-methylnaphthalene and alpha-naphthoic acid is recovered.

5. A process as defined in claim 1 wherein said mono-alkylnaphthalene is beta-methylnaphthalene and beta-naphthoic acid is recovered.

References Cited in the file of this patent
UNITED STATES PATENTS

| | | |
|---|---|---|
| 2,245,528 | Loder | June 10, 1941 |
| 2,444,924 | Farkas et al. | July 13, 1948 |
| 2,833,816 | Saffer et al. | May 6, 1958 |